US012340591B2

(12) United States Patent
Misawa

(10) Patent No.: US 12,340,591 B2
(45) Date of Patent: Jun. 24, 2025

(54) AUTONOMOUS DRIVING SYSTEM, AUTONOMOUS DRIVING METHOD, AND AUTONOMOUS DRIVING PROGRAM

(71) Applicant: DENSO CORPORATION, Kariya (JP)

(72) Inventor: Hideaki Misawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 18/455,489

(22) Filed: Aug. 24, 2023

(65) Prior Publication Data

US 2023/0401870 A1 Dec. 14, 2023

Related U.S. Application Data

(63) Continuation of application No. PCT/JP2022/006780, filed on Feb. 18, 2022.

(30) Foreign Application Priority Data

Feb. 25, 2021 (JP) ................. 2021-029263

(51) Int. Cl.
*G06V 20/54* (2022.01)
*B60W 50/14* (2020.01)
(Continued)

(52) U.S. Cl.
CPC ............. *G06V 20/54* (2022.01); *B60W 50/14* (2013.01); *B60W 60/001* (2020.02);
(Continued)

(58) Field of Classification Search
CPC ........ G06V 20/54; G06V 10/70; G06V 20/58;
B60W 50/14; B60W 60/001; B60W 2050/146; B60W 2540/215; B60W 2556/10; B60W 2556/20; B60W 2556/45; G08G 1/16
See application file for complete search history.

(56) References Cited

U.S. PATENT DOCUMENTS

| | | | |
|---|---|---|---|
| 2012/0161951 A1* | 6/2012 | Ito | B60Q 9/008 340/435 |
| 2019/0171896 A1* | 6/2019 | Okada | G06V 10/255 |
| 2022/0207279 A1* | 6/2022 | Kuybeda | H04N 25/671 |

FOREIGN PATENT DOCUMENTS

| | | |
|---|---|---|
| JP | 2003-30776 A | 1/2003 |
| JP | 2008-26985 A | 2/2008 |

(Continued)

*Primary Examiner* — Michael E Teitelbaum
(74) *Attorney, Agent, or Firm* — Maschoff Brennan

(57) ABSTRACT

An autonomous driving system includes a recognition unit configured to recognize an obstacle based on image data obtained by imaging a predetermined region including a road on which an autonomous vehicle travels, the imaging being performed by an imaging device installed at a specific location in the external environment of the autonomous vehicle, a feature quantity distribution creation unit configured to create a feature quantity distribution expressing a distribution of features related to obstacles recognized in the past, and an erroneous recognition judgement unit configured to compare the created feature quantity distribution with a feature quantity of an obstacle recognized as an evaluation subject, to thereby judge whether the obstacle recognized as the evaluation subject is erroneously recognized.

9 Claims, 10 Drawing Sheets

(51) Int. Cl.
 B60W 60/00 (2020.01)
 G06V 10/70 (2022.01)
(52) U.S. Cl.
 CPC ....... G06V 10/70 (2022.01); *B60W 2050/146* (2013.01); *B60W 2540/215* (2020.02); *B60W 2556/10* (2020.02); *B60W 2556/20* (2020.02); *B60W 2556/45* (2020.02)

(56) References Cited

FOREIGN PATENT DOCUMENTS

| | | |
|---|---|---|
| JP | 2016-057677 A | 4/2016 |
| JP | 2019-021201 A | 2/2019 |
| JP | 2019-127329 A | 8/2019 |

\* cited by examiner

EXAMPLE OF COMPARISON USING EUCLIDIAN DISTANCE

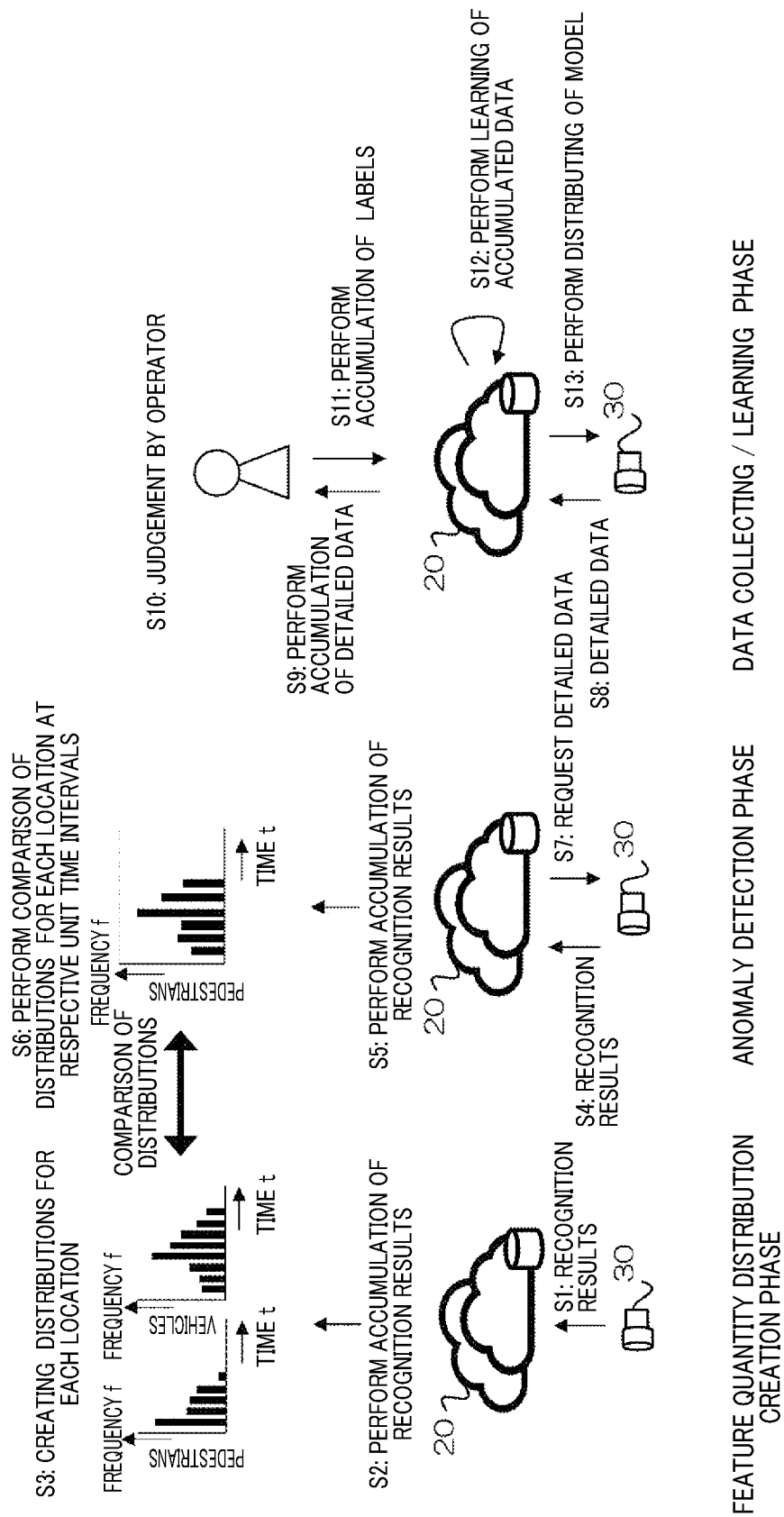

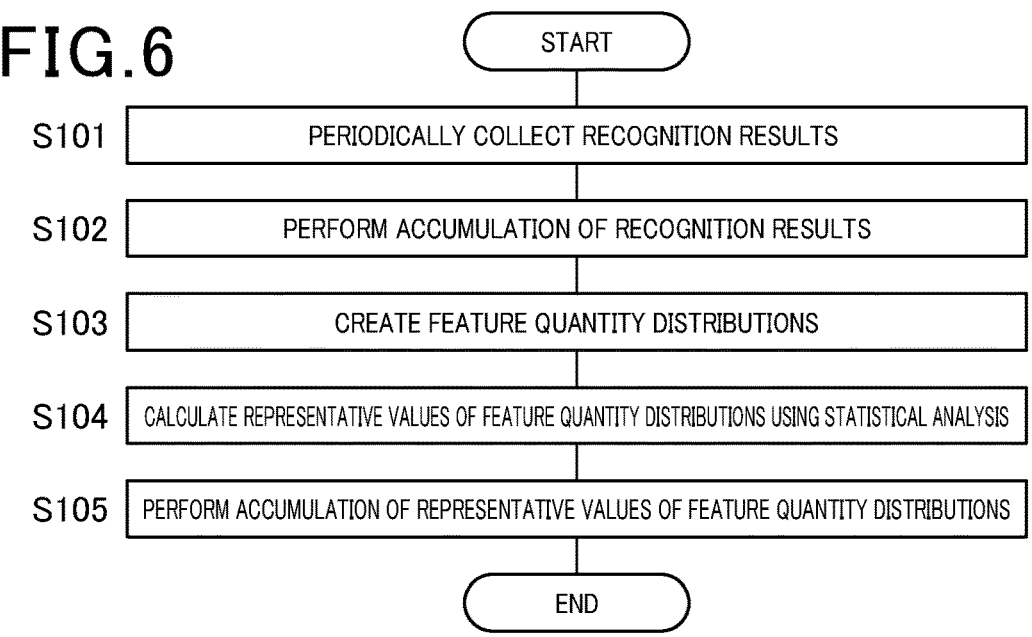

FIG.6

- S101 PERIODICALLY COLLECT RECOGNITION RESULTS
- S102 PERFORM ACCUMULATION OF RECOGNITION RESULTS
- S103 CREATE FEATURE QUANTITY DISTRIBUTIONS
- S104 CALCULATE REPRESENTATIVE VALUES OF FEATURE QUANTITY DISTRIBUTIONS USING STATISTICAL ANALYSIS
- S105 PERFORM ACCUMULATION OF REPRESENTATIVE VALUES OF FEATURE QUANTITY DISTRIBUTIONS

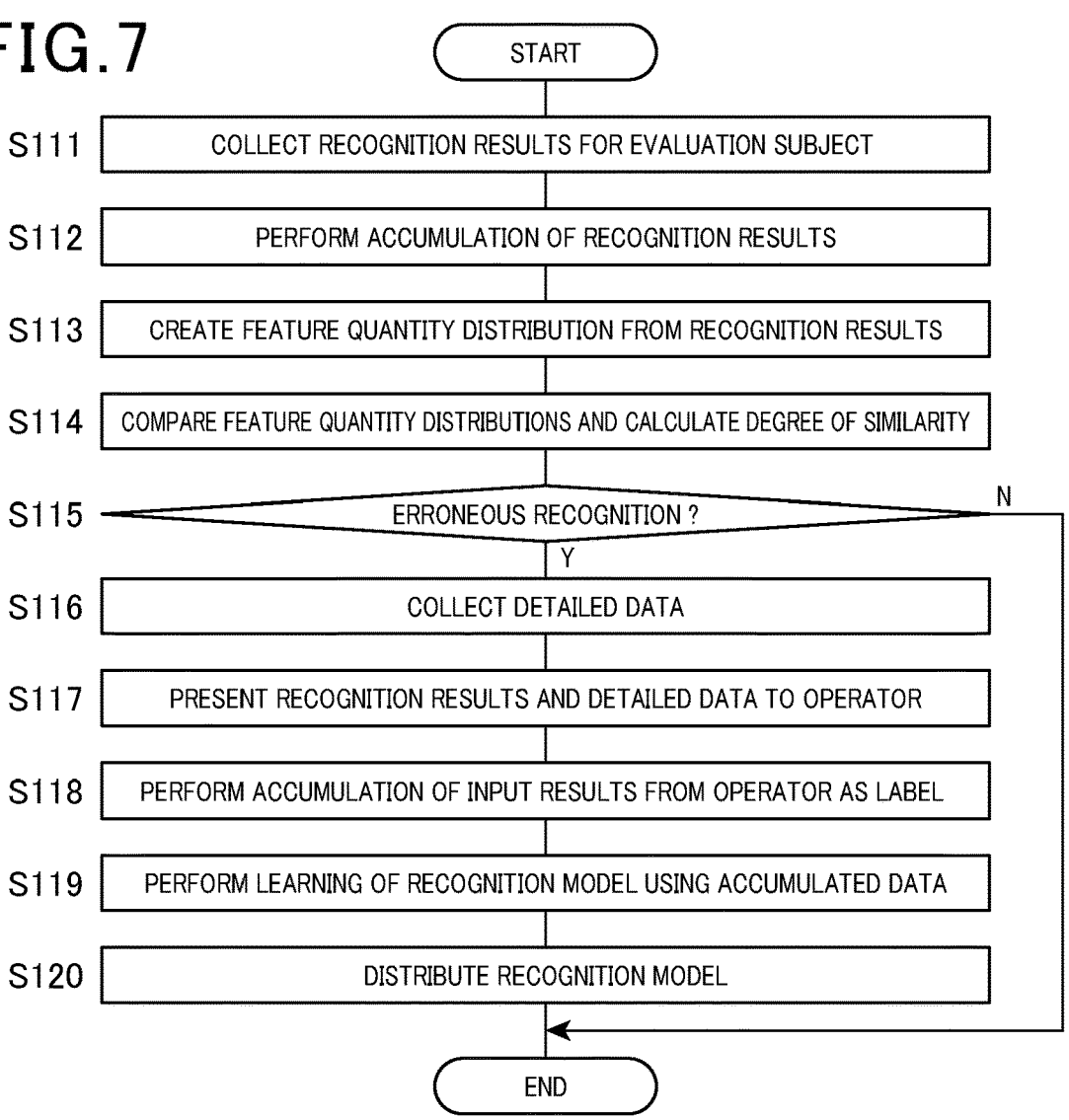

FIG.7

- S111 COLLECT RECOGNITION RESULTS FOR EVALUATION SUBJECT
- S112 PERFORM ACCUMULATION OF RECOGNITION RESULTS
- S113 CREATE FEATURE QUANTITY DISTRIBUTION FROM RECOGNITION RESULTS
- S114 COMPARE FEATURE QUANTITY DISTRIBUTIONS AND CALCULATE DEGREE OF SIMILARITY
- S115 ERRONEOUS RECOGNITION?
- S116 COLLECT DETAILED DATA
- S117 PRESENT RECOGNITION RESULTS AND DETAILED DATA TO OPERATOR
- S118 PERFORM ACCUMULATION OF INPUT RESULTS FROM OPERATOR AS LABEL
- S119 PERFORM LEARNING OF RECOGNITION MODEL USING ACCUMULATED DATA
- S120 DISTRIBUTE RECOGNITION MODEL

AUTONOMOUS DRIVING SYSTEM, AUTONOMOUS DRIVING METHOD, AND AUTONOMOUS DRIVING PROGRAM

CROSS-REFERENCE TO RELATED APPLICATION

The present application is a continuation application of International Application No. PCT/JP2022/006780, filed on Feb. 18, 2022, which claims priority to Japanese Patent Application No. 2021-029263, filed on Feb. 25, 2021. The contents of these applications are incorporated herein by reference in their entirety.

BACKGROUND

Technical Field

The present disclosure relates to an autonomous driving system, an autonomous driving method, and an autonomous driving program.

Background Art

An autonomous driving system acquires image data of a predetermined region that includes an autonomous vehicle, from a camera installed beside the road on which the autonomous vehicle travels. Obstacles such as pedestrians, parked vehicles, etc. are recognized based on the acquired image data, as the autonomous vehicle travels.

SUMMARY

In the present disclosure, provided is an autonomous driving system as the following.

The autonomous driving system includes: a recognition unit configured to recognize obstacles based on image data obtained by imaging a predetermined region including a road on which an autonomous vehicle travels, the imaging being performed by an imaging device installed at a specific location in the external environment of the autonomous vehicle; a creation unit configured to create a feature quantity distribution expressing a distribution of features quantities relating to obstacles that have been recognized by recognition unit in the past for each of the locations where the obstacles were recognized and for each of the types of the obstacles; and a judgement unit configured to compare (i) a feature amount distribution corresponding to the location and type of an obstacle recognized as an evaluation target created by the creation unit with (ii) a feature quantity of the obstacle recognized as the evaluation subject, to thereby judge whether the obstacle recognized as the evaluation subject is erroneously recognized.

BRIEF DESCRIPTION OF THE DRAWINGS

The above and other objects, features and advantages of the present disclosure will become more apparent from the following detailed description, given with reference to the accompanying drawings. In the accompanying drawings:

FIG. 5 is a diagram for explaining a feature quantity distribution creation phase, an anomaly detection phase, and a data collection/learning phase according to the first embodiment;

FIG. 6 is a flowchart showing an example of the flow of feature quantity distribution creation processing of an autonomous driving program according to the first embodiment;

FIG. 7 is a flowchart showing an example of the flow of anomaly detection processing and of data collection/learning processing by the autonomous driving program according to the first embodiment;

DETAILED DESCRIPTION OF THE PREFERRED EMBODIMENTS

Figure 1:
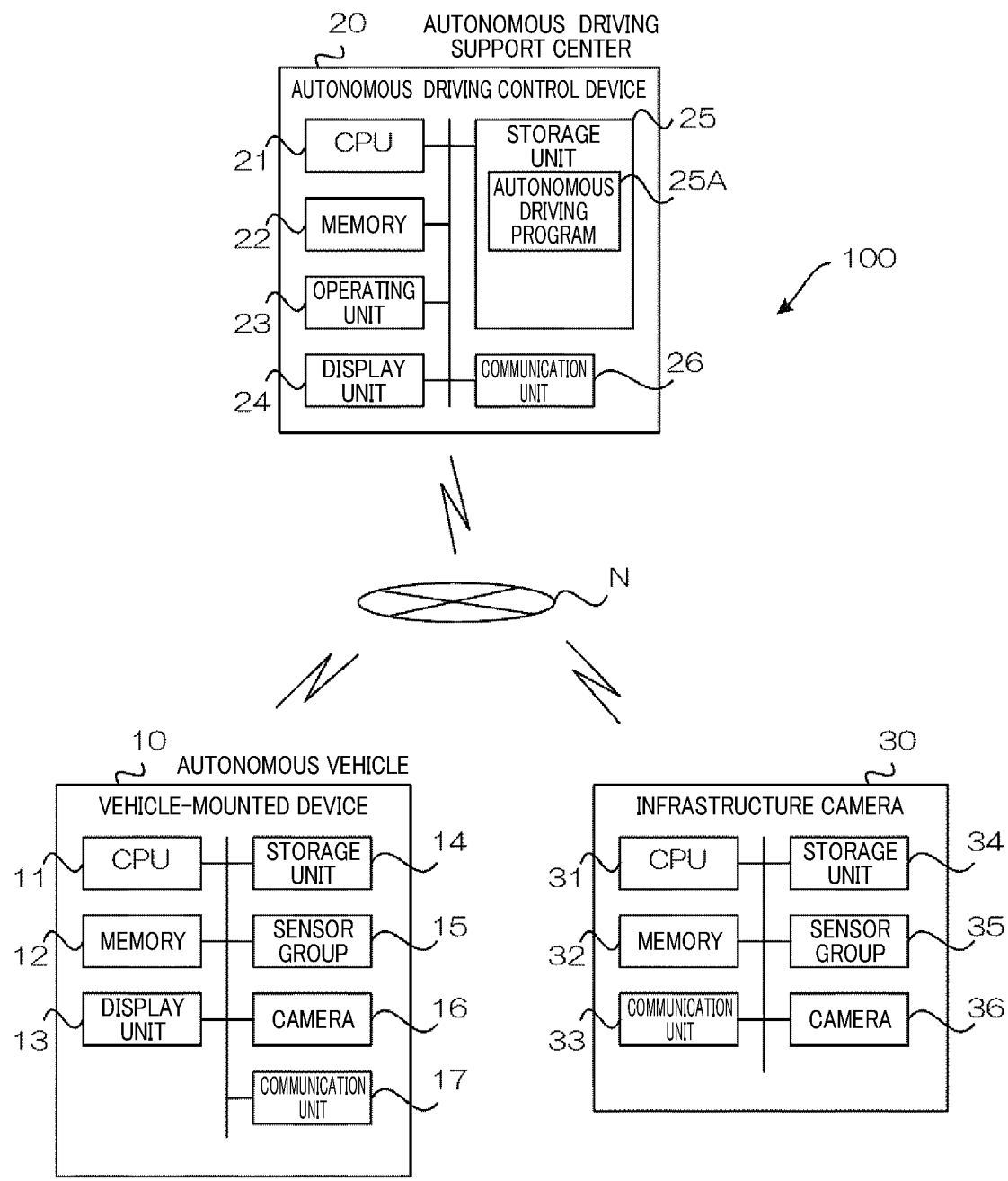
FIG. 1 is a diagram showing an example of the configuration of an autonomous driving system according to a first embodiment.

For example, PTL 1 describes a driving support control device which, when an autonomous vehicle is traveling, suppresses erroneous recognition of a control target vehicle as being an obstacle, with the suppression of erroneous recognition being based on image data obtained from a camera installed beside the road traveled by the autonomous vehicle. The driving support control device is provided with at least one camera that is disposed external to a control target vehicle capable of autonomous driving, and that acquires image information by imaging a predetermined region containing the control target vehicle, a driving support unit that supports autonomous driving of the control target vehicle within the predetermined region based on the image information acquired by the camera, a position determining unit that determines the position of the control target vehicle based on the image information acquired by the camera, and a control target vehicle region removal unit that, based on the position of the control target vehicle as determined by the position determining unit, removes at least a control target vehicle region from the image information acquired by the camera. The driving support unit supports autonomous driving of the control target vehicle while recognizing obstacles within the predetermined region, with the control target vehicle region being removed from the predetermined region by the control target vehicle removal unit.

[PTL 1]: Japanese Patent Publication No. 2016-57677

With the technique described in PTL 1, if the obstacle recognition accuracy decreases, an obstacle may be erroneously recognized (that is, recognized as an obstacle when it is not actually one). When an obstacle is erroneously recognized, the autonomous vehicle must take actions such as stopping in front of the obstacle or avoiding the obstacle, which interferes with driving.

The present disclosure provides an autonomous driving system, an autonomous driving method, and an autonomous driving program, capable of suppressing erroneous recognition of obstacles based on image data from an imaging device installed at a specific location in the external environment of an autonomous vehicle.

An autonomous driving system according to a first aspect of the present disclosure includes a recognition unit configured to recognize obstacles based on image data obtained by imaging a predetermined region including a road on which an autonomous vehicle travels, the imaging being performed by an imaging device installed at a specific location in the external environment of the autonomous vehicle, a creation unit configured to create a feature quantity distribution expressing a distribution of feature quantities relating to obstacles recognized in the past by the recognition unit, and a judgement unit configured to compare the feature quantity distribution created by the creation unit with a feature quantity of an obstacle that has been recognized as an evaluation subject, to thereby judge whether the recognition of the obstacle as an evaluation subject is erroneous.

An autonomous driving method according to a second aspect of the present disclosure includes recognizing an obstacle based on image data obtained by imaging a predetermined region including a road on which an autonomous vehicle travels, the imaging being performed by an imaging device installed at a specific location in the external environment of the autonomous vehicle, creating a feature quantity distribution that expresses a distribution of feature quantities relating to obstacles recognized in the past, comparing the feature quantity distribution that has been created with a feature quantity of an obstacle that has been evaluated as an evaluation subject, to thereby judge whether the recognition of the obstacle as an evaluation subject is erroneous.

An autonomous driving program according to a third aspect of the present disclosure causes a computer to function as a recognition unit configured to recognize an obstacle based on image data obtained by imaging a predetermined region including a road on which an autonomous vehicle travels, the imaging being performed by an imaging device installed at a specific location in the external environment of the autonomous vehicle, a creation unit configured to create a feature quantity distribution expressing a distribution of feature quantities relating to obstacles recognized in the past by the recognition unit, and a judgement unit configured to compare the feature quantity distribution created by the creation unit with a feature quantity of an obstacle that has been evaluated as an evaluation subject, to thereby judge whether the recognition of the obstacle as an evaluation subject is erroneous.

With the disclosed technology, it is made possible to suppress erroneous recognition of obstacles based on image data from an imaging device installed at a specific location in the external environment of an autonomous vehicle.

Examples of forms of implementing the technology of the present disclosure are described in detail in the following with reference to the drawings.

First Embodiment

FIG. 1 is a diagram showing an example of the configuration of an autonomous driving system 100 according to the first embodiment.

As shown in FIG. 1, an autonomous driving system 100 according to the present embodiment includes a vehicle-mounted device 10 mounted to an autonomous vehicle, an autonomous driving control device 20 provided in an autonomous driving support center, and a camera (hereinafter referred to as an "infrastructure camera") 30 installed at a specific position in the external environment of the autonomous vehicle. Specific types of position include, for example, public places such as a road. Infrastructure cameras 30 may be installed, for example using facilities such as utility poles and streetlights around a road.

The autonomous driving control device 20 provides remote support to the autonomous vehicle within the region managed by the autonomous driving support center. In this embodiment, an autonomous vehicle is exemplified by a private passenger car, however the present invention is applicable to other types of vehicles such as trucks, buses, and taxis. In addition, the types of autonomous vehicle can include manned vehicles in which it is possible for an occupant to control the vehicle, or to take over control of the vehicle in an emergency. Vehicles in which part of the steering of the vehicle is performed automatically are also included.

The vehicle-mounted device 10 and the autonomous driving control device 20 are connected to communicate with each other via a network N. The network N is, for example, the Internet, a WAN (Wide Area Network), or the like. The infrastructure camera 30 and the autonomous driving control device 20 are also connected to communicate with each other via the network N. The infrastructure camera 30 and the vehicle-mounted device 10 of an autonomous vehicle that is traveling in the surroundings of the infrastructure camera 30 are also connected to communicate with each other via the network N.

An autonomous vehicle is a vehicle that can travel automatically under predetermined conditions, without being operated by a driver. If a situation such as a parked vehicle, traffic congestion, construction work, etc. occurs on the road where an autonomous vehicle is traveling, the autonomous vehicle will overtake or will wait. The autonomous vehicles receive travel support from the autonomous driving support center in accordance with the situation, such as when an anomaly occurs.

The vehicle-mounted device 10 has a function of generating a travel plan, including a travel route to a destination, based on destination information such as an address or latitude and longitude, and a function of controlling autonomous driving of the own vehicle. The vehicle-mounted device 10 includes a CPU (Central Processing Unit) 11, a memory 12, a display unit 13, a storage unit 14, a sensor group 15, a camera 16, and a communication unit 17.

The CPU 11 is an example of a processor. The term "processor" is used here in a broad sense that includes a general-purpose processor (e.g., CPU), a dedicated processor (e.g., GPU: Graphics Processing Unit, ASIC: Application Specific Integrated Circuit, FPGA: Field Programmable Gate Array, programmable logic devices, etc.). The memory 12 is composed of a ROM (Read Only Memory), a RAM (Random Access Memory), or the like.

A liquid crystal display (LCD), an organic EL (Electro Luminescence) display, or the like may be used for the display unit 13. The display unit 13 may have an integrated touch panel.

An HDD (Hard Disk Drive), SSD (Solid State Drive), flash memory, or the like may be used for the storage unit 14. The storage unit 14 stores a control program (not shown) for controlling autonomous driving.

The sensor group 15 is composed of various sensors for determining conditions in the environment of the own vehicle. The sensor group 15 can include a millimeter wave radar that transmits search waves to a predetermined range outside the vehicle, and a LIDAR (Light Detection and Ranging/Laser Imaging Detection and Ranging) apparatus that scans at least a predetermined region in front of the vehicle. The sensor group 15 may also include a GNSS (Global Navigation Satellite System) receiver mounted to the own vehicle, which acquires information such as the current position of the own vehicle, and the current time.

The camera 16 captures images within a predetermined region in predetermined directions from the own vehicle. Specifically, the camera 16 can be provided such as to photograph the entire region around the own vehicle. A single camera 16 may be used, or a plurality of cameras 16 may be respectively provided at a plurality of locations in order to obtain more information.

The communication unit 17 is a communication interface that connects to a network N such as the Internet or a WAN, for communicating with the autonomous driving control device 20.

The vehicle-mounted device 10 is connected to travel devices (not shown) that are necessary for autonomous driving, and performs autonomous driving by controlling the travel devices. The travel devices can include an electrically powered steering device, electronically controlled brakes, electronically controlled throttle, etc., for example.

The vehicle-mounted device 10 implements autonomous travel by controlling the driving, steering, and braking of the own vehicle such that the vehicle operates automatically in accordance with a travel plan. There are various known methods of effecting autonomous driving, and the present embodiment is not limited to a particular method.

An infrastructure camera 30 is an example of an image capture device, and is installed, for example, beside a road on which autonomous vehicles travel, with the function of monitoring a predetermined region that contains the road. The infrastructure camera 30 includes a CPU 31, a memory 32, a communication unit 33, a storage unit 34, a sensor group 35, and a camera 36.

The CPU 31 is an example of a processor. The term "processor" is used here in a broad sense that includes general-purpose processors and dedicated processors, as described above. The memory 32 is composed of a ROM, RAM, etc.

The communication unit 33 is a communication interface that connects to a network N such as the Internet or a WAN, for communication with the autonomous driving control device 20.

An HDD, SSD, flash memory, or the like is used as the storage unit 34, which stores a control program (not shown) for controlling the operation of the infrastructure camera 30.

The sensor group 35 is composed of various sensors for determining the conditions in the environment of the infrastructure camera 30, and includes at least a LIDAR apparatus or the like which scans a predetermined region in front of the camera.

The camera 36 acquires time-series image data (moving image data) by imaging a predetermined region which includes the road on which the autonomous vehicle travels. The camera 36 may consist of a single camera or a plurality of cameras.

The autonomous driving control device 20 monitors the vehicle state of an autonomous vehicle by periodically communicating with the vehicle-mounted device 10 of the autonomous vehicle. In addition, the autonomous driving control device 20 monitors the state of obstacles by periodically communicating with the infrastructure camera 30. A general-purpose computer device such as a server computer or a PC (personal computer) can be used, for example, as the autonomous driving control apparatus 20, which includes a CPU 21, a memory 22, an operating unit 23, a display unit 24, a storage unit 25, and a communication unit 26.

The CPU 21 is an example of a processor. The term "processor" is used here in a broad sense, including general-purpose processors and dedicated processors, as described above. The memory 22 is composed of a ROM, a RAM, etc.

The operating unit 23 is configured as an interface for receiving operation inputs to the autonomous driving control device 20. The display unit 24 may use a liquid crystal display (LCD), an organic EL display, or the like, and may have an integrated touch panel.

An HDD, SSD, flash memory, or the like is used for the storage unit 25. The storage unit stores an autonomous driving program 25A in accordance with the embodiment, which may be pre-installed in the autonomous driving control device 20, for example. The autonomous driving program 25A may be stored in a non-volatile non-transitory recording medium. Alternatively, the autonomous driving program 25A may be executed by being distributed via the network N and appropriately installed in the autonomous driving control device 20. Examples of non-volatile non-transitional recording media include CD-ROM (Compact Disc Read Only Memory), magneto-optical disc, HDD, DVD-ROM (Digital Versatile Disc Read Only Memory), flash memory, memory card, etc.

The communication unit 26 is a communication interface that connects to a network N such as the Internet or a WAN and that communicates with the vehicle-mounted device 10 and the infrastructure camera 30.

If the obstacle recognition accuracy decreases, objects that are not obstacles may be erroneously recognized as being obstacles, and this may interfere with the running of autonomous vehicles.

Figure 2:
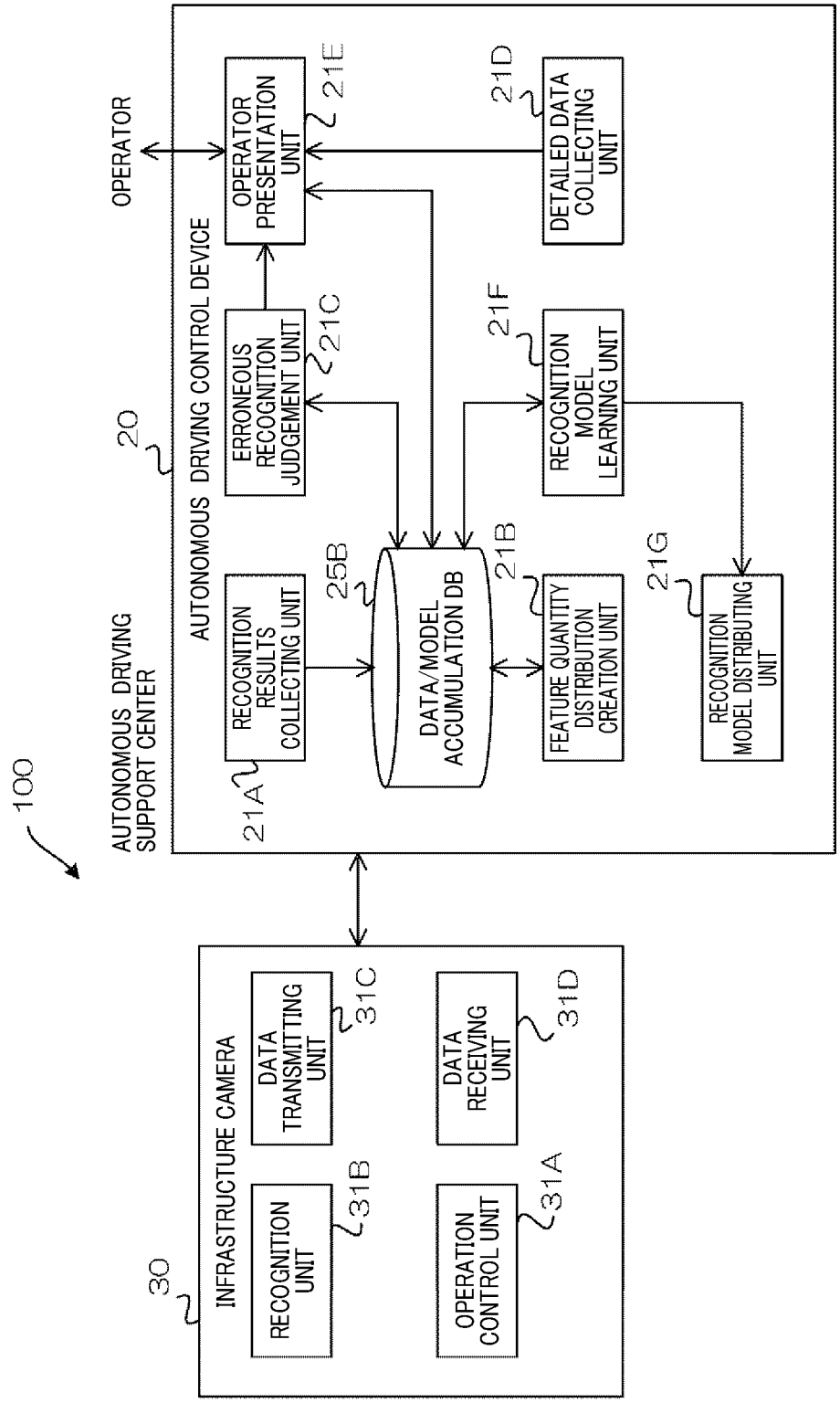
FIG. 2 is a block diagram showing an example of functional configurations of an infrastructure camera and an autonomous driving control device according to the first embodiment.

Hence, the CPU 31 of an infrastructure camera 30 according to the present embodiment functions as the units shown in FIG. 2, by writing the control program stored in the storage unit 34 into RAM and executing the program. In addition, the CPU 21 of the autonomous driving control device 20 according to the present embodiment functions as the units shown in FIG. 2, by writing the autonomous driving program 25A stored in the storage unit 25 into RAM and executing the program.

FIG. 2 is a block diagram showing an example of functional configurations of the infrastructure camera 30 and the autonomous driving control device 20 according to the first embodiment.

In this embodiment, the infrastructure camera 30 is provided with a recognition unit, and an obstacle feature quantity distribution is used as an evaluation subject, with obstacle feature quantity distributions being extracted by batch processing that is performed in respective predetermined periods.

As shown in FIG. 2, the CPU 31 of the infrastructure camera 30 according to this embodiment functions as an operation control unit 31A, a recognition unit 31B, a data transmitting unit 31C, and a data receiving unit 31D.

The operation control unit 31A controls the operations of the sensor group 35 and the camera 36, respectively. The operation control unit 31A stores time-series sensor data, acquired from the sensor group 35, in the storage unit 34, and also stores time-series image data, obtained by imaging with the camera 36, in the storage unit 34.

The recognition unit 31B recognizes an obstacle from the time-series image data obtained by imaging with the camera 36, or from the image data and sensor data. As described above, the image data is obtained by imaging a predetermined region that includes a road on which autonomous vehicles travel. Obstacles may be, for example, parked vehicles, pedestrians, etc. With the example of this embodiment, recognition models derived by machine learning are used for obstacle recognition. The recognition models are stored in the storage unit 34. The embodiment is not limited to any particular machine learning method, and methods using neural networks, random forests, and support vector machines, etc., may be employed. The recognition unit 31B accumulates the obstacle recognition results in the storage unit 34. The recognition results for an obstacle include the recognition identification (ID), time, position information, type, tracking continuation time, direction of the obstacle, speed of the obstacle, and the grid coordinates of the obstacle. The type expresses the form of obstacle, such as a parked vehicle or a pedestrian. The tracking continuation time expresses the elapsed time from when the infrastructure camera 30 commences recognition of an obstacle in the grid until the recognition is interrupted, that is, the dwell time of the obstacle. Known technologies such as geohash, nodes, etc., for example, may be used for the grid.

The data transmitting unit 31C executes control for transmitting the recognition results obtained for an obstacle by the recognition unit 31B to the autonomous driving control apparatus via the communication unit 33. The data transmitting unit 31C also executes control for transmitting the recognition results obtained for an obstacle by the recognition unit 31B to autonomous vehicles traveling in the surroundings of the obstacle, with the recognition results being transmitted via the communication unit 33.

The data receiving unit 31D performs control for receiving, via the communication unit 33, recognition models that have been relearned by the autonomous driving control device 20.

Furthermore, as shown in FIG. 2, the CPU 21 of the autonomous driving control device according to the present embodiment includes a recognition result collection unit 21A, a feature quantity distribution creation unit 21B, an erroneous recognition judgement unit 21C, a detailed data collection unit 21D, an operator presentation unit 21E, a recognition model learning unit 21F, and a recognition model distributing unit 21G.

The recognition result collection unit 21A periodically collects obstacle recognition results from the infrastructure camera 30, and accumulates the collected recognition results in a data/model accumulation database (hereinafter referred to as "data/model accumulation DB") The data/model accumulation DB 25B is stored in the storage unit 25 in the example of this embodiment, but could be stored in an external storage device.

Based on the recognition results accumulated in the data/model accumulation DB 25B, the feature quantity distribution creation unit 21B creates a feature quantity distribution that expresses a distribution of feature quantities relating to obstacles which have been recognized in the past. A feature quantity distribution may, for example, consist of at least one of a dwell time distribution that expresses the distribution of dwell times of obstacles, a travel speed distribution that expresses the distribution of travel speeds of obstacles, and a travel distance distribution that expresses the distribution of distances moved by obstacles. The travel distance of an obstacle is calculated from the grid coordinates of the obstacle, which are included in the recognition results for the obstacle. Furthermore, a feature quantity distribution may consist of at least one of the distribution of the coordinates of obstacles, the distribution of directions of obstacles, and the distribution of anomaly causes (labels) which are entered by an operator concerning the results of erroneous obstacle recognition judgements. The feature quantity distribution creation unit 21B is an example of a creation unit.

A specific description will be given here, with reference to FIG. 3, of the case in which the created feature quantity distributions are dwell time distributions.

Figure 3:
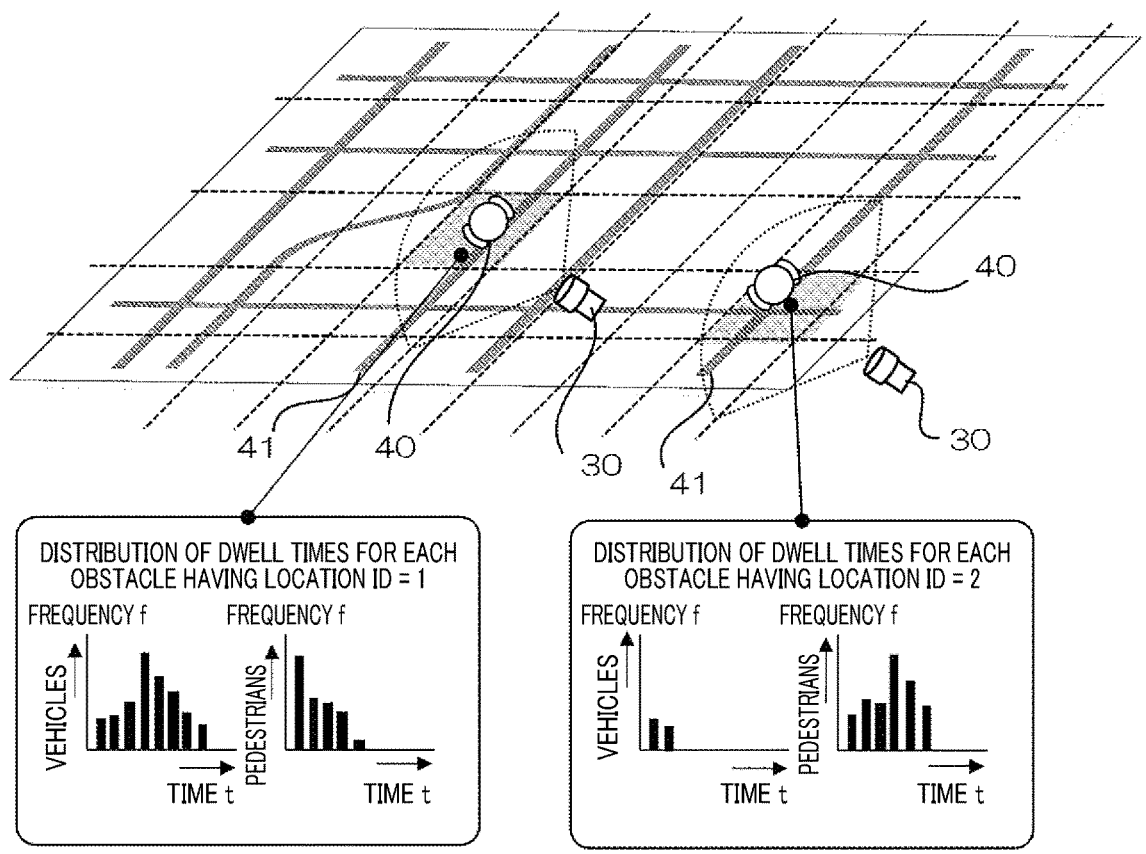
FIG. 3 is a diagram for explaining dwell time distribution creation processing according to the first embodiment.

FIG. 3 is a diagram for explaining the dwell time distribution creation process according to the present embodiment.

As shown in FIG. 3, an infrastructure camera 30 acquires time-series image data by continuously or periodically imaging a predetermined region that includes a road 41 on which autonomous vehicles travel, and recognizes obstacles 40 (in the example of FIG. 3, pedestrians) from the acquired image data.

The recognition result collection unit 21A periodically collects the dwell times of the obstacles from the infrastructure cameras 30 as described above. The predetermined regions are formed as divisions of a grid, each identified by a location ID. The recognition result collection unit 21A accumulates the collected dwell times in the data/model accumulation DB 25B such that the types and dwell times of obstacles can be specified for each of the location IDs into which the grid is divided.

For each of the location IDs separated by the grid and each of the types of obstacle detected in that location ID, the feature quantity distribution creation unit 21B aggregates the dwell times of the type and thereby calculates a representative value of dwell time for that type in that location ID. The aggregation is performed based on the dwell times accumulated in the data/model accumulation DB 25B. As described above, geohash can be used for the grid, for example. FIG. 3 shows an example of respective distributions of dwell times of respective types of obstacles (here, pedestrians and parked vehicles) at each of respective location IDs. Time t is shown along the horizontal axis, number of obstacles (frequency f) along the vertical axis, and the numbers of obstacles in respective time periods are shown as histograms. It should be noted that when creating these histograms, the number of bins and the bin width are determined for each grid instead of being uniform regardless of the grid. The method of determining the number of bins and the bin width may use the Sturges formula, for example, or may be based on the distribution of data accumulated for each grid.

The average value, maximum value, minimum value, or variance, etc., of the dwell times may be used as the representative value of dwell time. The feature quantity distribution generator 21B calculates a representative dwell time value $x_d$ based on dwell times expressed as durations of tracking within the grid. It would be equally possible to calculate representative values of travel speed and of travel distance, when creating the distributions, by aggregating the travel speeds of the obstacles, and the travel distances of the obstacles respectively. An array of representative values obtained in this way can be represented as a feature vector x, as shown below. Here, T indicates a transposed matrix.

$$x=(x_1,x_2,x_3,\ldots,x_d)^T$$

The erroneous recognition judgement unit 21C compares the feature quantity distribution of an obstacle recognized as an evaluation subject with a feature quantity distribution created by the feature quantity distribution creation unit 21B, and judges whether the recognition of the obstacle as an evaluation subject is erroneous. The feature quantity distribution that is created for this comparison (i.e., as 1 comparison sample) is obtained from a specific previous period, for example the preceding one-month period. It would be equally possible for the feature quantity distributions to be created by the feature quantity distribution creation unit 21B in units of weeks, with 5 one-week units of weeks (5 samples) corresponding to one month, or in units of days, with 7 days (7 samples) corresponding to one week. Specifically, for each obstacle recognized as an evaluation subject, the erroneous recognition judgement unit 21C compares at least one of a dwell time distribution, travel speed distribution, and travel distance distribution created by the feature quantity distribution creation unit 21B with at least one of the dwell time distribution, travel speed distribution, and travel distance distribution of the obstacle recognized as an evaluation subject, and judges whether the recognition is erroneous. This comparison is performed based on at least one of a representative value obtained from statistical analysis of the dwell time distribution, a representative value obtained from statistical analysis of the travel speed distribution, and a representative value obtained from statistical analysis of the travel distance distribution. The erroneous recognition judgement unit 21C is an example of a judgement unit. It should be noted that that it would also be possible to use the number of obstacles recognized per unit period of time as an index of erroneous recognition. That is, if there are many obstacles recognized at a location where that would not normally occur, it could be judged that there is erroneous recognition.

An example will be described with reference to FIG. 4, in which judgement as to erroneous recognition of an obstacle is performed by using dwell time, travel speed, and travel distance as a plurality of feature quantities.

Figure 4:
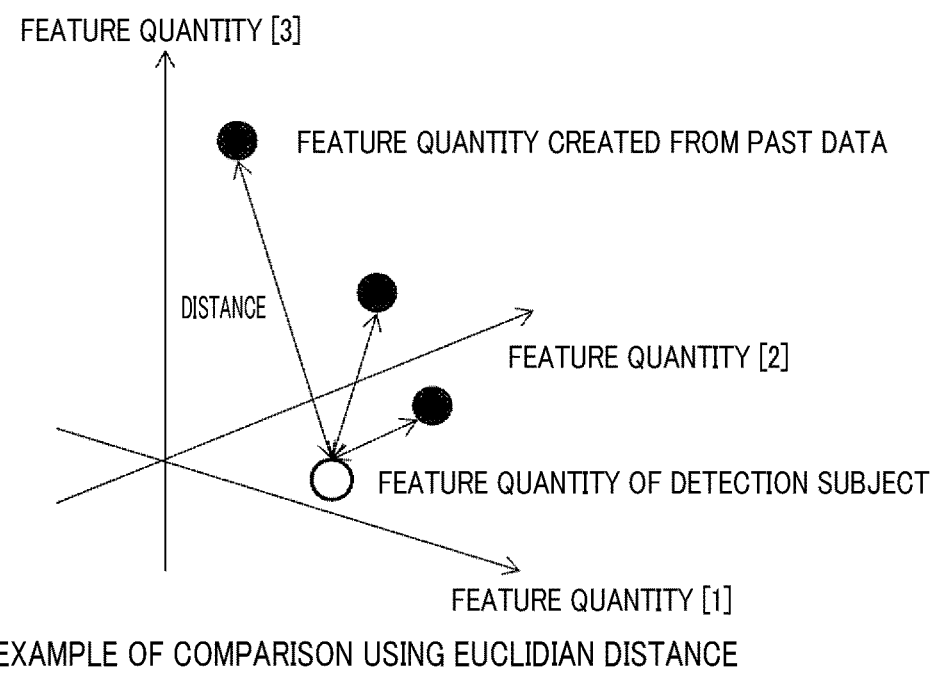
FIG. 4 is a diagram for explaining erroneous recognition judgement processing according to the first embodiment.

FIG. 4 is a diagram for explaining erroneous recognition judgement processing according to the first embodiment.

The erroneous recognition determination unit 21C generates a feature vector of representative values of feature amount distributions (dwell time distribution, travel speed distribution, and travel distance distribution) created for each grid from past recognition results, and a feature vector of representative values of feature amount distributions created from the recognition results for the evaluation subject, and compares these feature vectors to calculate a degree of similarity. The recognition results for evaluation subjects may be extracted by batch processing at the end of each day. Alternatively, the recognition results may be batch-processed periodically, in every N hours (unit time interval). Euclidean distance can be used to calculate a degree of similarity, as illustrated in FIG. 4. In that case, the shorter the Euclidean distance, the greater the degree of similarity. The degree of similarity between collected previously obtained recognition results and the recognition results obtained for an evaluation subject obstacle is thereby calculated, and a judgement made as to whether the recognition of the obstacle is erroneous. For example, the average similarity distance between samples when there are no anomalies (i.e., when there is no erroneous recognition) may be obtained beforehand and set as a threshold value, and cases in which the similarity distance exceeds the threshold value can then be judged to be instances of erroneous recognition (anomalies).

The method of calculating the degree of similarity is not limited to using Euclidean distance. For example, the k-nearest neighbor method, MMD (Maximum Mean Discrepancy), KL distance, or the like, may be used in performing a comparison to obtain a degree of similarity. The k-nearest neighbor method has the characteristic of enabling appropriate evaluation even if the distribution of data is complicated. Compared with other inter-distribution distance measurement methods, MMD has characteristics such as enabling arbitrary distribution shapes to be considered, and ease of calculation. Furthermore, if MMD is used, it is possible to perform the comparison by using variables such as dwell time, travel speed and travel distance to constitute a feature vector (=1 sample) for each recognition ID, without calculating representative values.

When the erroneous recognition judgement unit 21C judges that an obstacle has been erroneously recognized, the detailed data collection unit 21D collects image data and sensor data from the infrastructure camera 30, as detailed data. Specifically, since it is possible to specify the infrastructure camera 30, the location, and the time at which the erroneous recognition was judged to occur, the infrastructure camera 30 concerned is instructed to upload the detailed data in the related grid. This eliminates the need to collect detailed data for all times, i.e., it is only necessary to select detailed data for relevant times.

When the erroneous recognition judgement unit 21C judges that an obstacle is recognized erroneously, the operator presentation unit 21E presents the image data for the erroneous recognition to the operator, and receives judgement results from the operator that include indications of whether there is an anomaly, and the causes. Sensor data may also be presented to the operator in addition to the image data. The operator presentation unit 21E accumulates, as a label (correct answer label), the judgement results including the presence or absence of abnormality and the causes input by the operator, in the data/model accumulation DB 25B. The label is accumulated in association with the recognition results. The recognition results, detailed data, labels, etc. are registered in the data/model accumulation DB 25B as negative learning examples, so that they can readily be used for learning by a recognition model at a later stage.

The recognition model learning unit 21F performs relearning of a recognition model for an obstacle by using learning data, with the learning data including the recognition results, detailed data, and labels accumulated in the data/model accumulation DB 25B. Recognition models similar to the recognition models stored in the storage unit 34 of the infrastructure camera 30 are stored in the data/model accumulation DB 25B. The recognition model learning unit 21F is an example of a learning unit.

The recognition model distributing unit 21G distributes the recognition models relearned by the recognition model learning unit 21F to an infrastructure camera 30 via the communication unit 26. The infrastructure camera 30 uses the distributed relearned recognition models to update the recognition models stored in the storage unit 34.

FIG. 5 is a diagram for explaining a feature quantity distribution creation phase, an anomaly detection phase, and a data collection/learning phase according to the first embodiment.

In (S1) of the feature quantity distribution creation phase shown in FIG. 5, the CPU 21 of the autonomous driving control device 20 collects obstacle recognition results from an infrastructure camera 30. As described above, the obstacle recognition results include, for example, the recognition ID, time, position information, type, tracking continuation duration, direction of an obstacle, speed of an obstacle, coordinates of an obstacle within the grid, etc.

In (S2) of the feature quantity distribution creation phase, the CPU 21 of the autonomous driving control device 20 accumulates, in the data/model accumulation DB 25B, past recognition results collected from the infrastructure camera 30, such that the types and dwell times of obstacles can be specified for each of the locations into which the grid is divided.

In (S3) of the feature quantity distribution creation phase, the CPU 21 of the autonomous driving control device 20 creates, as an example, dwell time distributions for each of the locations, based on the past recognition results accumulated in the data/model accumulation DB 25B. At this time, representative values of dwell time are respectively calculated for each type of obstacle at each of the locations into which the grid is divided. The calculated representative values are accumulated in the data/model accumulation DB 25B as the usual distributions of dwell time for these locations.

In (S4) of the anomaly detection phase, the CPU 21 of the autonomous driving control device 20 collects obstacle recognition results per unit of time from the infrastructure cameras for each of respective grids (locations), by performing periodic batch processing in time units such as units of days, for example.

In (S5) of the anomaly detection phase, the CPU 21 of the autonomous driving control device 20 accumulates, in the data/model accumulation DB 25B, the obstacle recognition results per unit of time, collected from the infrastructure camera 30 as evaluation subject recognition results.

In (S6) of the anomaly detection phase, the CPU 21 of the autonomous driving control device 20 creates, as an example, dwell time distributions for each of the locations, based on the evaluation subject recognition results accumulated in the data/model accumulation DB 25B. The CPU 21 compares the dwell time distribution that has been created based on the recognition results for an evaluation subject with the dwell time distribution created in (S3) based on past recognition results, to judge whether the obstacle recognized as the evaluation subject is erroneously recognized.

In (S7) of the anomaly detection phase, if the CPU 21 of the autonomous driving control device 20 judges in (S6) that an obstacle is erroneously recognized, the CPU 21 specifies the location and time to the infrastructure camera 30, and instructs the infrastructure camera 30 to upload detailed data (image data and sensor data) in the relevant grid.

In (S8) of the data collection/learning phase, the CPU 21 of the autonomous driving control device 20 collects the detailed data (image data and sensor data) uploaded from the infrastructure camera 30.

In (S9) of the data collection/learning phase, the CPU 21 of the autonomous driving control device 20 associates the detailed data (image data and sensor data), collected from an infrastructure camera 30, with the recognition results for an evaluation subject, and accumulates the detailed data and recognition results in the data/model accumulation DB 25B.

In (S10) of the data collection/learning phase, the CPU 21 of the autonomous driving control device 20 presents the recognition result for the evaluation subject and detailed data to an operator, and receives judgement results from the operator that include indications of whether there is an anomaly, and the causes.

In (S11) of the data collection/learning phase, the CPU 21 of the automatic driving control device 20 associates the recognition results for the evaluation subject and detailed data, as a label, with the judgement results received from the operator that include indications of whether there is an anomaly, and the causes. The CPU 21 accumulates the recognition results, the detailed data, and the label in the data/model accumulation DB 25B.

In (S12) of the data collection/learning phase, the CPU 21 of the autonomous driving control device 20 executes relearning of the recognition model of the obstacle, using learning data that include the recognition results, detailed data, and labels accumulated in the data/model accumulation DB 25B.

In (S13) of the data collection/learning phase, the CPU 21 of the autonomous driving control device 20 distributes the recognition model relearned in (S12) to the infrastructure camera 30. Based on the distributed relearned recognition model, the infrastructure camera 30 updates the recognition model of the obstacle that is stored in the storage unit 34.

The operation of the autonomous driving control device 20 according to the first embodiment will next be described with reference to FIGS. 6 and 7.

FIG. 6 is a flowchart showing an example of the flow of feature quantity distribution creation processing by the autonomous driving program 25A according to the first embodiment.

First, when the autonomous driving control device 20 is instructed to execute the feature quantity distribution creation process, the autonomous driving program 25A is started and the following steps are executed.

In step S101 of FIG. 6, the CPU 21 periodically collects, from the infrastructure camera recognition results for obstacles recognized in the past. As described above, the recognition results for an obstacle include, for example, the recognition ID, time, position information, type, tracking duration, direction of the obstacle, speed of the obstacle, coordinates of the obstacle in the grid, etc.

In step S102, the CPU 21 accumulates, in the data/model accumulation DB 25B, the past obstacle recognition results that are periodically collected in step S101.

In step S103, the CPU 21 creates a feature quantity distribution of past recognition results, based on the past recognition results accumulated in the data/model accumulation DB in step S102. As a specific example, as shown in FIG. 3 described above, for each of the locations (location IDs) into which the grid is partitioned, the dwell times of each type of obstacle in the location are collected, and respective dwell time distributions are created for the types.

In step S104, the CPU 21 statistically analyzes the feature quantity distributions created in step S103, and calculates representative values of feature quantity distribution for each type of obstacle. Specifically, the dwell time distributions are statistically analyzed, and representative values of dwell time distribution are calculated for each of the types. A representative value of a distribution may be, for example, the average value, maximum value, minimum value, or variance, etc., of the distribution.

In step S105 the CPU 21 accumulates, in the data/model accumulation DB 25B, the representative values of the feature quantity distributions (with this example, dwell time distribution) obtained for respective obstacle types in step S104, and the feature quantity distribution creation processing by the autonomous driving program 25A is then ended.

FIG. 7 is a flowchart showing an example of the flow of anomaly detection processing and data collection/learning processing performed by the autonomous driving program 25A according to the first embodiment.

Firstly, when the autonomous driving control device 20 is instructed to perform anomaly detection processing and data collection/learning processing, execution of the autonomous driving program 25A is started and the following steps are executed.

In step S111 of FIG. 7, the CPU 21 collects recognition results for an obstacle recognized as an evaluation subject, from an infrastructure camera 30.

In step S112 the CPU 21 accumulates, in the data/model accumulation DB 25B, the recognition results obtained for the obstacle recognized as an evaluation subject, collected in step S111.

In step S113, based on the recognition results obtained for the evaluation subject, accumulated in the data/model accumulation DB 25B in step S112, the CPU 21 creates a feature quantity distribution of the recognition results for the evaluation subject.

In step S114, the CPU 21 compares the representative values of the feature quantity distribution for each of the obstacle types, accumulated in the data/model accumulation DB in step S105 of FIG. 6, with the representative values of the feature quantity distribution of the evaluation subject, created in step S113, and calculates the degree of similarity, for example as shown in FIG. 4 described above.

In step S115, the CPU 21 judges whether the obstacle recognized as the evaluation subject is recognized erroneously, as an example, as shown in FIG. 4, based on the degree of similarity calculated in step S114. If the recognition is judged to be erroneous (an affirmative decision), the process proceeds to step S116, while if it is judged that the recognition is not erroneous (a negative decision), the CPU 21 terminates the anomaly detection processing and data collection/learning processing by the autonomous driving program 25A.

If it is judged that there is an erroneous recognition, then in step S116 the CPU 21 collects image data and sensor data corresponding to the time at which the erroneous recognition was determined, from the infrastructure camera 30, as detailed data, associates the collected detailed data with the recognition results, and accumulates the collected detailed data and recognition results in the data/model accumulation DB 25B.

In step S117, the CPU 21 presents the operator with the recognition results and detailed data accumulated in the data/model accumulation DB 25B in step S116, and receives judgement results from the operator that include indications as to whether there is an anomaly, and the causes.

In step S118, the CPU 21 stores the judgement results that are input from the operator in step S117 as a label, and accumulates a data set that includes the recognition results, detailed data, and label in the data/model accumulation DB 25B, as learning data.

In step S119, the CPU 21 relearns the recognition model of the obstacle, using the learning data accumulated in the data/model accumulation DB 25B in step S118.

In step S120, the CPU 21 distributes the recognition model relearned in step S119 to the infrastructure camera 30, and terminates the anomaly detection processing and data collection/learning processing by the autonomous driving program 25A. The infrastructure camera 30 updates the recognition model stored in the storage unit 34, based on the distributed relearned recognition model.

As described above, according to the present embodiment, when recognition of an obstacle by an infrastructure camera is judged to be erroneous, the judgement results are fed back to a recognition model. Erroneous recognition of obstacles can thereby be suppressed.

Second Embodiment

With the first embodiment above, a mode has been described in which a recognition unit is provided in an infrastructure camera, and feature quantity distributions of obstacles are used as evaluation subjects, with the feature quantity distributions being extracted by batch processing in respective predetermined periods. With the second embodiment, a mode will be described in which a recognition unit is provided in the infrastructure camera, and feature quantities of obstacles are used as evaluation subjects, with the feature quantities being extracted in real time.

Figure 8:
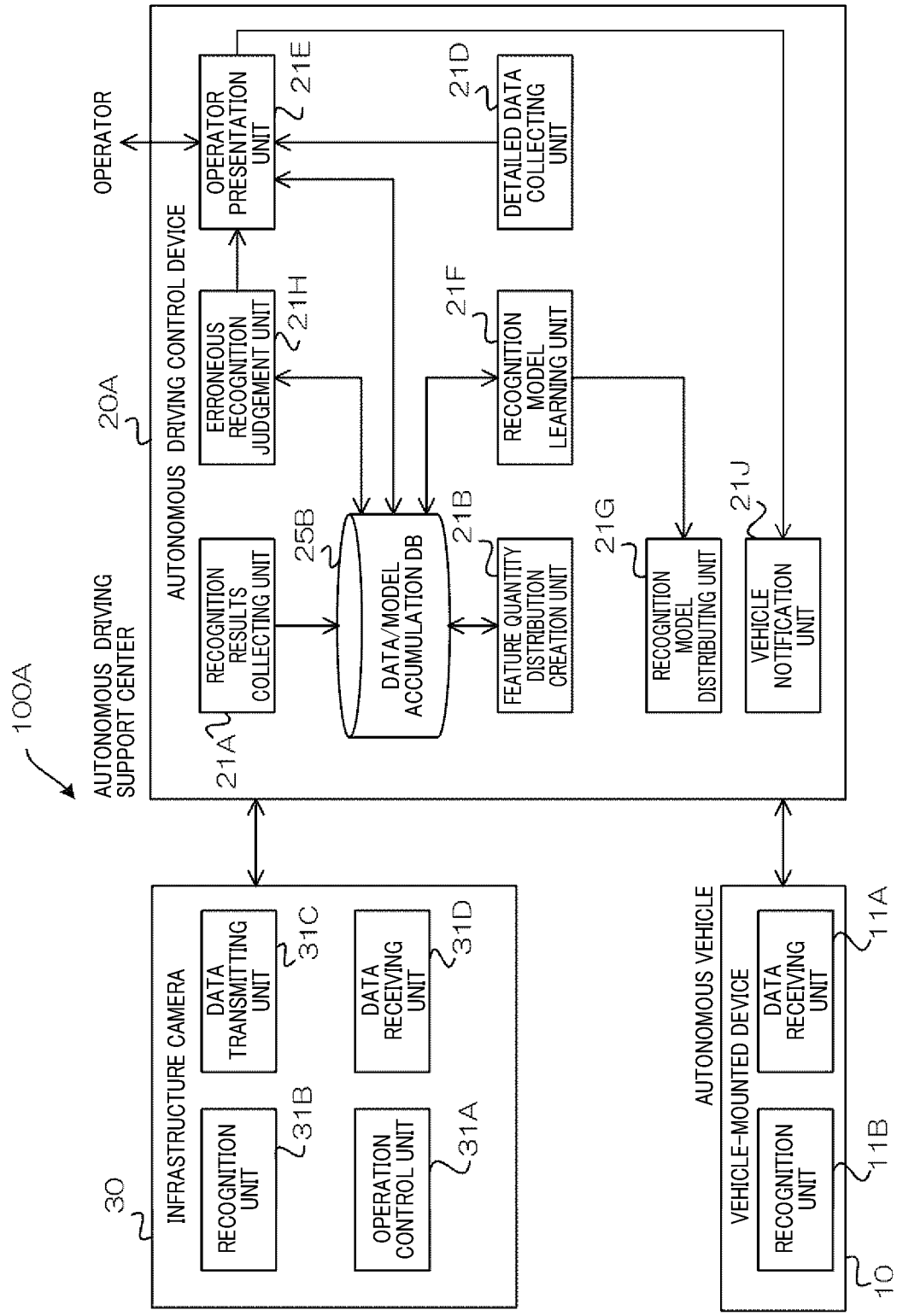
FIG. 8 is a block diagram showing an example of functional configurations of an infrastructure camera, an autonomous driving control device, and a vehicle-mounted device according to a second embodiment.

FIG. 8 is a block diagram showing an example of functional configurations of an infrastructure camera 30, an autonomous driving control device 20A, and a vehicle-mounted device 10 according to the second embodiment. The infrastructure camera 30, autonomous driving control device 20A, and vehicle-mounted device 10, constitute an autonomous driving system 100A.

In this embodiment the infrastructure camera 30 is provided with a recognition unit, and feature quantities of obstacles are extracted in real time and used as evaluation subjects.

The CPU 31 of an infrastructure camera 30 according to the present embodiment is caused to function as the respective units shown in FIG. 8 by writing a control program stored in the storage unit 34 into RAM, and executing the program. In addition, the CPU 21 of the autonomous driving control device 20A according to the present embodiment is caused to function as the respective units shown in FIG. 8 by writing an autonomous driving program 25A stored in the storage unit 25 into RAM and executing the program. Furthermore, the CPU 11 of a vehicle-mounted device 10 according to the present embodiment is caused to function as the respective units shown in FIG. 8 by writing a control program stored in the storage unit 14 into RAM and executing the program.

As shown in FIG. 8, the CPU 31 of an infrastructure camera 30 according to the present embodiment functions as an operation control unit 31A, a recognition unit 31B, a data transmitting unit 31C, and a data receiving unit 31D. Components of an infrastructure camera 30 according to the present embodiment are the same as components of the infrastructure camera 30 described in the first embodiment, and repeated description of these is omitted.

The CPU 21 of the autonomous driving control device 20A according to the present embodiment functions as a recognition result collection unit 21A, a feature quantity distribution creation unit 21B, an erroneous recognition judgement unit 21H, a detailed data collection unit 21D, an operator presentation unit 21E, a recognition model learning unit 21F, a recognition model distributing unit 21G, and a vehicle notification unit 21J. In the autonomous driving control device 20A, components that are identical to components in the autonomous driving control device 20 described in the first embodiment have the same reference numerals as for the first embodiment, and repeated description of these is omitted.

The erroneous recognition judgement unit 21H compares at least one of a dwell time distribution, a travel speed distribution, and a travel distance distribution, respectively created by the feature quantity distribution creation unit 21B, with at least one of the dwell time, the travel speed, and the travel distance, of an obstacle recognized as an evaluation subject, to judge whether the recognition of the obstacle is erroneous. This comparison is performed based on at least one of a threshold value obtained from the dwell time distribution, a threshold value obtained from the travel speed distribution, and a threshold value obtained from the travel distance distribution. The threshold values used in this example are the respective average values of dwell time distribution, travel speed distribution, and travel distance distribution.

A case will be described with reference to FIG. 9 in which erroneous recognition of an obstacle is judged using dwell time as an example of a feature quantity.

Figure 9:
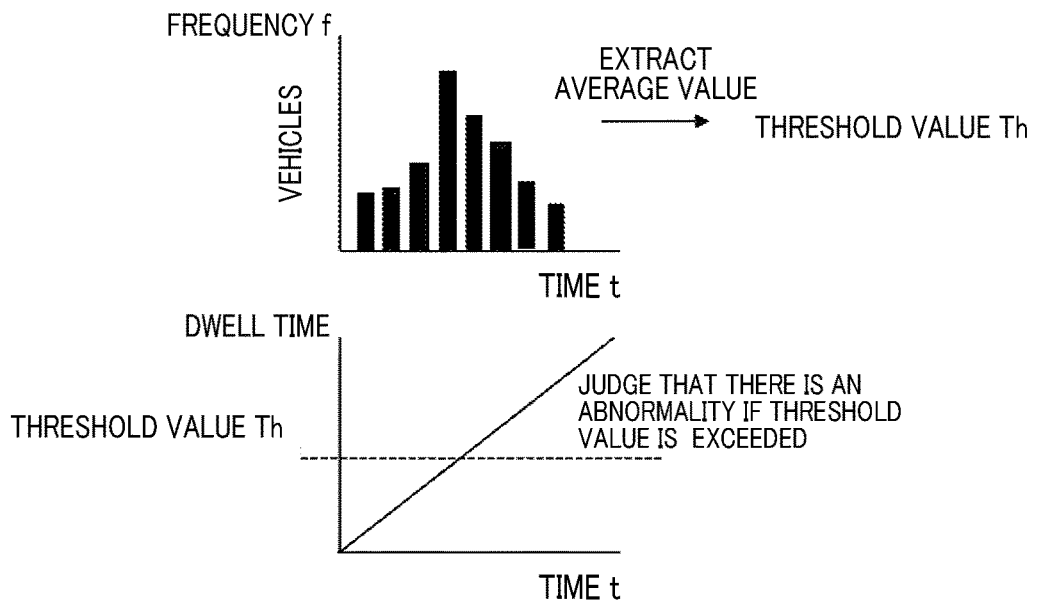
FIG. 9 is a diagram for explaining erroneous recognition judgement processing according to the second embodiment.

FIG. 9 is a diagram for explaining erroneous recognition judgement processing according to the second embodiment.

The example of FIG. 9, similarly to the example of FIG. 3 described above, illustrates distributions of dwell time created for respective types of obstacle (such as parked vehicles) for each of the locations into which the grid is divided. Time t is shown along the horizontal axis, number of obstacles is shown along the vertical axis, and the numbers of obstacles in respective time periods are shown as a histogram.

The erroneous recognition judgement unit 21H extracts respective threshold values Th of dwell time beforehand, for each of the grids, from dwell time distributions previously created based on past recognition results. With this example, the average value of the dwell time distribution created for a grid is used as the threshold value Th of dwell time for that grid. The erroneous recognition judgement unit 21H compares the extracted threshold value Th with the dwell time obtained from the recognition results for the evaluation subject, and judges that the recognition is erroneous if the dwell time obtained for the evaluation subject exceeds the threshold value. In this embodiment, the judgment as to whether an obstacle recognition is erroneous is performed in real time, with the judgement being executed when the dwell time for the evaluation subject is acquired.

Furthermore, if the erroneous recognition judgement unit 21H judges that an obstacle has been recognized erroneously, the vehicle notification unit 21J transmits obstacle information concerning the obstacle to the autonomous vehicle traveling in the surroundings of the obstacle, with a flag attached to the obstacle information for removing the obstacle recognition results. The vehicle notification unit 21J is an example of a notification unit.

Furthermore, when the erroneous recognition judgement unit 21H judges that an obstacle is recognized erroneously, the operator presentation unit 21E functions such as to present, to an operator, the image data and sensor data corresponding to the time at which the erroneous recognition was determined, and such as to receive, as input from the operator, judgement results including whether there is an anomaly, and the causes. If the input from the operator indicates that there is an anomaly, the vehicle notification unit 21J sends obstacle information to an autonomous vehicle traveling in the surroundings of the obstacle, with a flag attached to the obstacle information for removing the obstacle recognition results. In other words, if the operator judges that there is an anomaly concerning the recognition of an obstacle, the autonomous vehicle is notified to remove the recognition results for the obstacle. Specifically, an individual recognition ID is provided for each obstacle, and that recognition ID is assigned to the obstacle during tracking. Thus, by notifying an autonomous vehicle with a flag containing the recognition ID of an obstacle, the autonomous vehicle can be caused to remove the recognition results for the obstacle.

The CPU 11 of the vehicle-mounted device 10 according to this embodiment functions as a data receiving unit 11A and a recognition unit 11B.

The data receiving unit 11A performs control for receiving, from the vehicle notification unit 21J, obstacle information having a flag attached for removing obstacle recognition results.

The recognition unit 11B performs obstacle recognition based on image data captured by the camera 16 of its own device, and also based on obstacle recognition results obtained from an infrastructure camera 30. That is, the recognition unit 11B performs obstacle recognition by combining recognition results acquired using the obstacle recognition function of its own device with recognition results from the infrastructure camera 30. The recognition unit 11B shares, with the autonomous driving control device 20A, the recognition IDs included in the recognition results acquired from the infrastructure camera 30. Hence when obstacle information is received by the recognition unit 11B with a flag attached for removing the recognition results obtained for an obstacle, the recognition ID included in the flag enables the recognition unit 11B to specify that the recognition results for that obstacle are to be removed.

The operation of the autonomous driving control device 20A according to the second embodiment will be described with reference to FIGS. 10 and 11.

Figure 10:
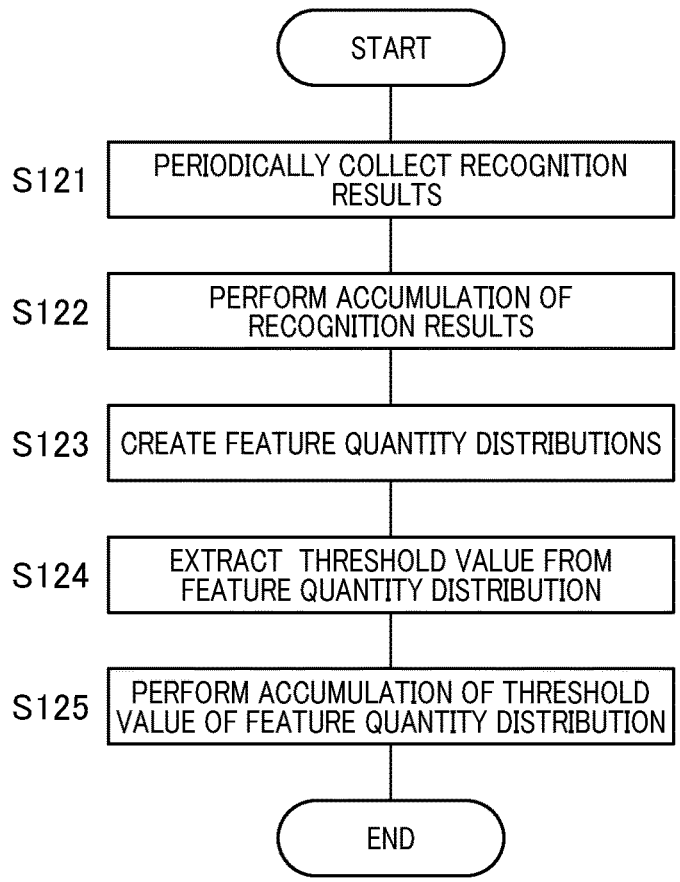
FIG. 10 is a flowchart showing an example of the flow of feature quantity distribution creation processing by an autonomous driving program according to the second embodiment.

FIG. 10 is a flowchart showing an example of the flow of feature quantity distribution creation processing by the autonomous driving program 25A according to the second embodiment.

First, when the autonomous driving control device 20A is instructed to execute the feature quantity distribution creation process, the autonomous driving program 25A is started and the following steps are executed.

In step S121 of FIG. 10 the CPU 21 periodically collects recognition results for obstacles that have been recognized in the past, from the infrastructure camera 30. As described above, the obstacle recognition results for an obstacle can include the recognition ID of the obstacle, and the time, position information, type, tracking duration, direction of the obstacle, speed of the obstacle, the obstacle coordinates within the grid, and the like.

In step S122 the CPU 21 accumulates, in the data/model accumulation DB 25B, the recognition results for obstacles that have been recognized in the past, periodically collected in step S121.

In step S123, the CPU 21 creates a feature quantity distribution of past recognition results based on the recognition results accumulated in the data/model accumulation DB 25B in step S122. With this specific example, for each of the locations into which the grid is divided, and for each obstacle type with respect to that location, the dwell times obtained for the obstacle type are aggregated, and a dwell time distribution is created for the obstacle type as illustrated in the example of FIG. 9 described above.

In step S124, the CPU 21 extracts a threshold value from the feature quantity distribution created in step S123. The average value of the feature quantity concerned is used as the threshold value in this example.

In step S125, the CPU 21 accumulates the threshold value of the feature quantity distribution (with this example, the dwell time distribution) obtained for each obstacle type in step S124, in the data/model accumulation DB 25B, then terminates this feature quantity distribution creation processing by the autonomous driving program 25A.

Figure 11:
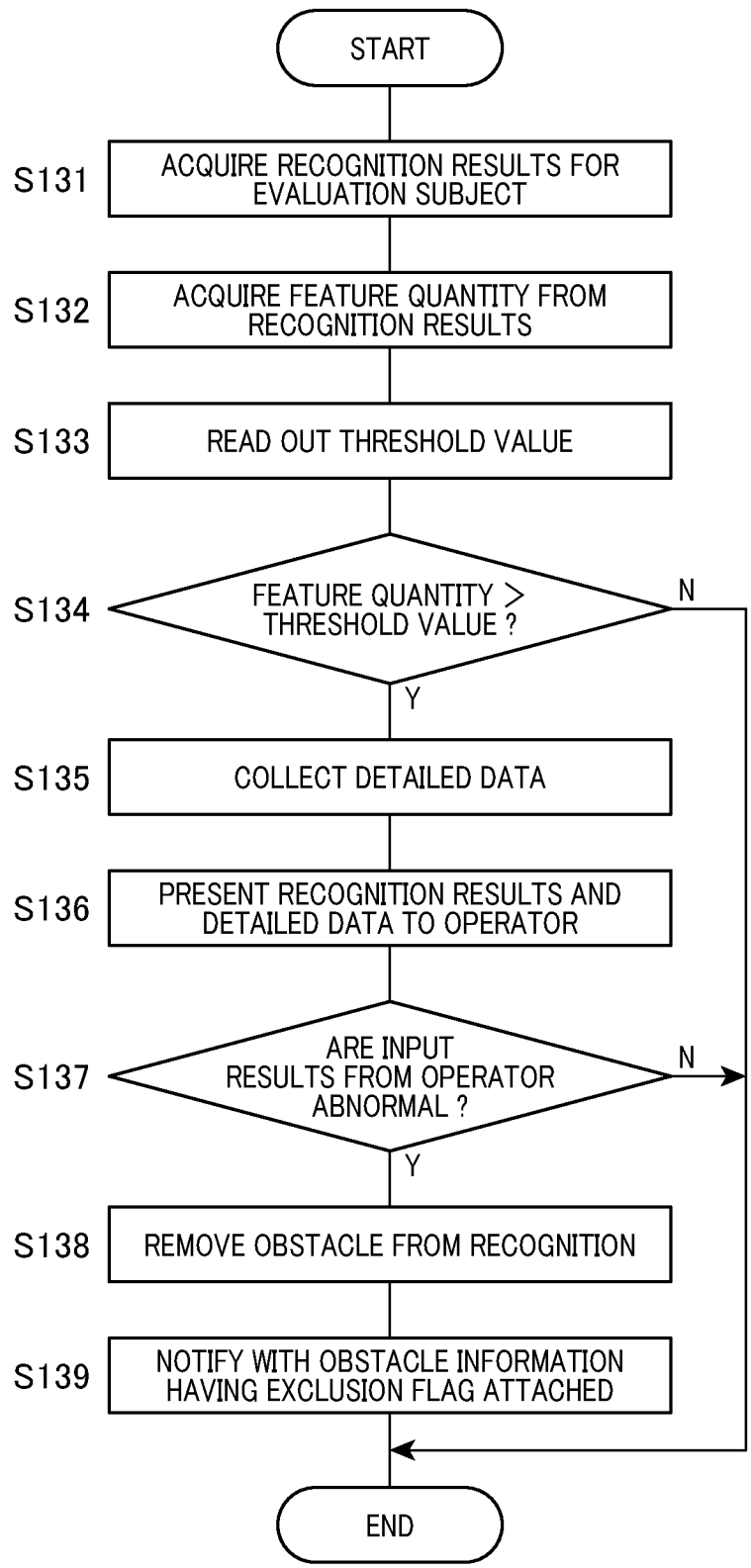
FIG. 11 is a flowchart showing an example of the flow of anomaly detection processing and of vehicle notification processing by the autonomous driving program according to the second embodiment.

FIG. 11 is a flowchart showing an example of the flow of anomaly detection processing and vehicle notification processing by the autonomous driving program 25A according to the second embodiment.

First, when the autonomous driving control device 20A is instructed to execute anomaly detection processing and vehicle notification processing, the autonomous driving program 25A is started and the following steps are executed.

In step S131 of FIG. 11 the CPU 21 acquires recognition results from an infrastructure camera 30, for an obstacle recognized as an evaluation subject.

In step S132, the CPU 21 acquires a feature quantity (for example, dwell time) from the recognition results for the obstacle recognized as an evaluation subject, acquired in step S131.

In step S133, the CPU 21 reads, from the data/model accumulation DB 25B, the threshold value corresponding to the feature quantity (for example, dwell time) acquired in step S132.

In step S134, as illustrated in FIG. 9, the CPU 21 judges, as an example, whether the feature quantity (for example, dwell time) is greater than the threshold value. If the feature quantity is determined to exceed the threshold value, that is, if the recognition is judged to be erroneous (an affirmative decision), the process proceeds to step S135. If it is judged that the recognition is not erroneous (a negative decision), the CPU 21 terminates this anomaly detection processing vehicle and notification processing by the autonomous driving program 25A.

In step S135, the CPU 21 collects image data and sensor data corresponding to the time at which the erroneous recognition was determined, from the infrastructure camera 30, as detailed data for use in judgement of erroneous recognition, and accumulates the collected detailed data in the data/model accumulation DB 25B, in association with the recognition results.

In step S136, the CPU 21 presents to the operator the recognition results and detailed data that were accumulated in the data/model accumulation DB 25B in step S135, and receives input of judgement results from the operator, including indication of whether there is an anomaly, and the causes.

In step S137, the CPU 21 judges whether the judgement results (input results) received from the operator in step S136 indicate an anomaly. If the judgement results (input results) indicate an anomaly (an affirmative decision), the processing proceeds to step S138, while if the judgement results (input results) indicate that there is no anomaly (a negative decision), the CPU 21 terminates this execution of the anomaly detection process and vehicle notification process by the autonomous driving program 25A.

In step S138, the CPU 21 attaches a flag (removal flag) to the obstacle information, for removing the obstacle recognition results that were determined to be abnormal in step S137.

In step S139 the CPU 21 notifies, to the autonomous vehicle traveling in the surroundings of the obstacle concerned, the obstacle information to which the removal flag was attached in step S138, with the notification being performed in real time, and the CPU 21 then terminates this execution of the anomaly detection process and vehicle notification process by the autonomous driving program 25A. Upon receiving the obstacle information notification, the autonomous vehicle removes the recognition results for the obstacle concerned, based on the flag attached to the obstacle information.

As described above, according to the present embodiment, when the recognition of an obstacle by an infrastructure camera is judged to be erroneous, the judgement results are immediately fed back to an autonomous vehicle. Hindrance to the travel of the autonomous vehicle due to erroneous recognition of obstacles can thereby be prevented.

Third Embodiment

In the third embodiment, a recognition unit is provided in the autonomous driving control device, and feature quantity distributions of obstacles are used as evaluation subjects, with the feature quantity distributions being extracted by batch processing in respective predetermined periods.

Figure 12:
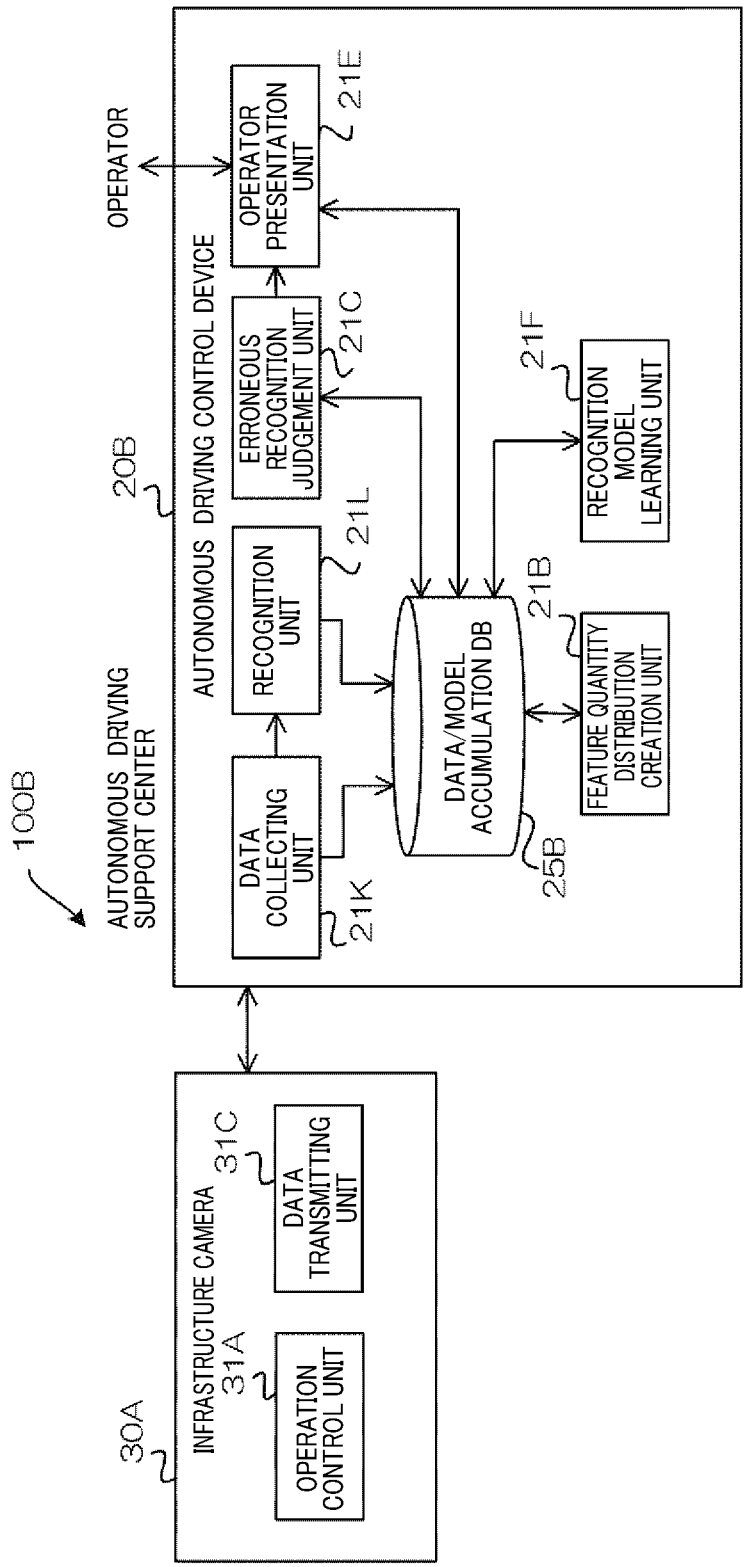
FIG. 12 is a block diagram showing an example of functional configurations of an infrastructure camera and an autonomous driving control device according to a third embodiment; and, FIG. 13 is a block diagram showing an example of functional configurations of an infrastructure camera, an autonomous driving control device, and a vehicle-mounted device according to a fourth embodiment.

FIG. 12 is a block diagram showing an example of the functional configurations of an infrastructure camera 30A and an autonomous driving control device 20B according to the third embodiment. The infrastructure camera 30A and the autonomous driving control device 20B constitute an autonomous driving system 100B.

In the present embodiment, the autonomous driving control device 20B includes a recognition unit, and obstacle feature quantity distributions, extracted by batch processing in respective predetermined periods, are used as evaluation subjects.

The CPU 31 of the infrastructure camera 30A according to the present embodiment functions as the units shown in FIG. 12 by writing a control program stored in the storage unit 34 into RAM, and executing the program. Furthermore, the CPU 21 of the autonomous driving control device 20B according to this embodiment functions as the units shown in FIG. 12 by writing the autonomous driving program 25A stored in the storage unit 25 into RAM, and executing the program.

As shown in FIG. 12, the CPU 31 of the infrastructure camera 30A according to the present embodiment functions as an operation control unit 31A and a data transmitting unit 31C. The infrastructure camera 30A according to the present embodiment has the same components as some of the components of the infrastructure camera 30A described in the first embodiment, and thus repeated description thereof will be omitted.

In addition, the CPU 21 of the autonomous driving control device 20B according to the present embodiment functions as a data collection unit 21K, a recognition unit 21L, a feature quantity distribution creation unit 21B, an erroneous recognition judgement unit 21C, an operator presentation unit 21E, and a recognition model learning unit 21F. Components of the autonomous driving control device 20B which are identical to components in the autonomous driving control device 20 of the first embodiment above have the same reference numerals as in the first embodiment, and repeated description of these is omitted.

The data collection unit 21K collects image data and sensor data from the infrastructure camera 30, and accumulates the collected image data and sensor data in the data/model accumulation DB 25B.

The recognition unit 21L recognizes obstacles by using a recognition model stored in the data/model accumulation DB 25B, based on the image data collected by the data collection unit 21K or based on image data and sensor data. The recognition unit 21L, associates the image data and sensor data with the recognition results obtained from recognizing obstacles, and accumulates the image data, sensor data and recognition results in the data/model accumulation DB 25B. As described above, the recognition results obtained for an obstacle include, for example, the recognition ID of the obstacle, the time, position information, type, tracking duration, direction of the obstacle, speed of the obstacle, and the coordinates of the obstacle in the grid.

In the present embodiment, having the recognition unit 21L provided in the autonomous driving control device 20B, obstacle recognition processing is performed by the autonomous driving control device 20B instead of by the infrastructure camera 30A. Furthermore, updating of the recognition model is performed by the autonomous driving control device 20B instead of by the infrastructure camera 30A.

According to the present embodiment, when the autonomous driving control device of the center judges that the recognition of an obstacle is erroneous, the judgement results are fed back to the recognition model. Erroneous recognition of obstacles can thereby be suppressed.

Fourth Embodiment

A fourth embodiment will be described, having a form in which a recognition unit is provided in the autonomous driving control apparatus, and in which feature quantities of obstacles, extracted in real time, are used as the evaluation subjects.

Figure 13:
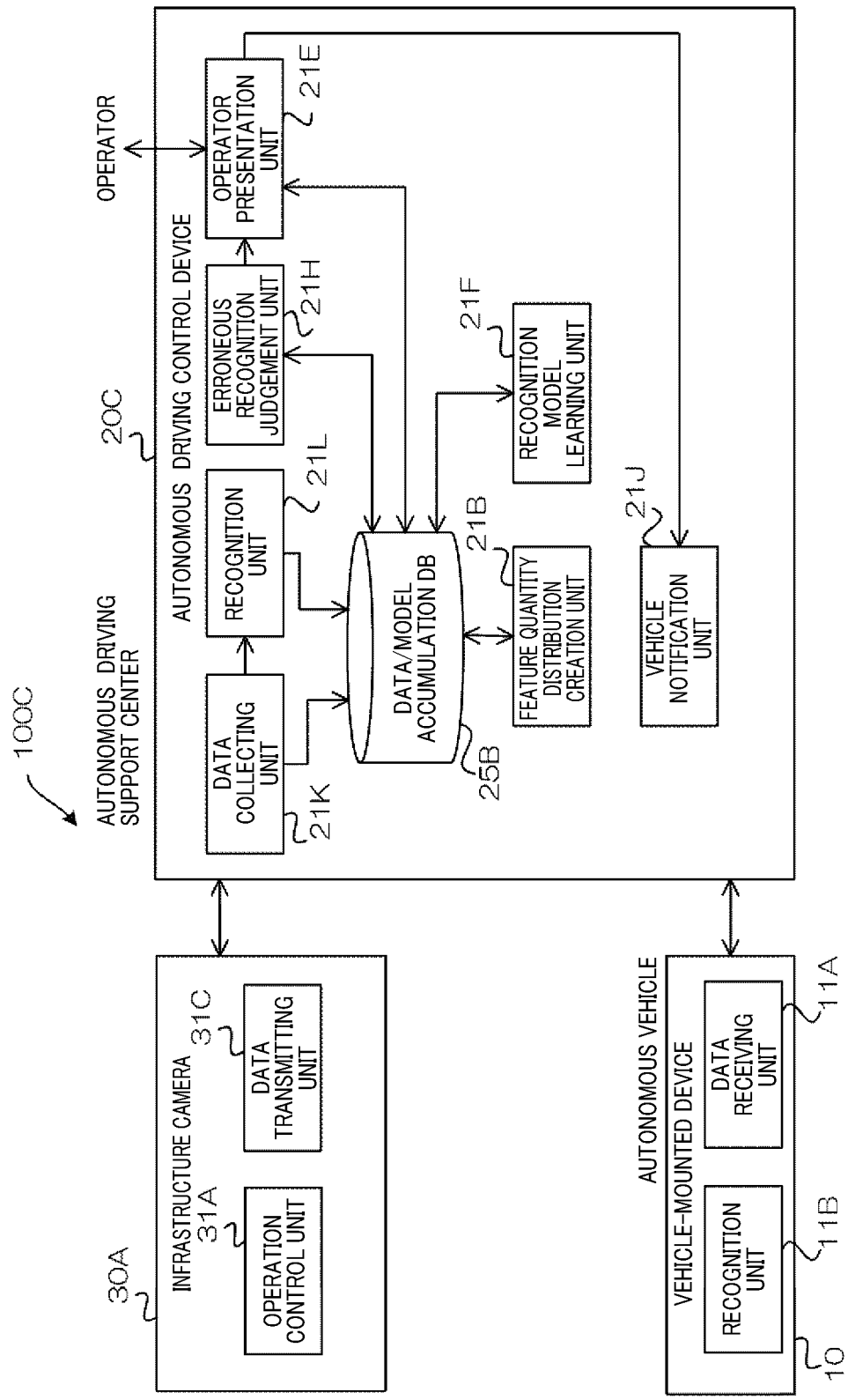

FIG. 13 is a block diagram showing an example of the functional configurations of an infrastructure camera 30A, an autonomous driving control device 20C, and a vehicle-mounted device 10 according to the fourth embodiment. The infrastructure camera 30A, the autonomous driving control device 20C, and the vehicle-mounted device 10 constitute an autonomous driving system 100C.

In the present embodiment, the autonomous driving control device 20C is provided with a recognition unit, and feature quantities of obstacles, extracted in real time, are used as the evaluation subjects.

The CPU 31 of the infrastructure camera 30A according to this embodiment implements the functions of the units shown in FIG. 13 by writing a control program stored in the storage unit 34 into RAM, and executing the program. Furthermore, the CPU 21 of the autonomous driving control device 20C according to the present embodiment implements the functions of the units shown in FIG. 13 by writing an autonomous driving program 25A stored in the storage unit 25 into RAM, and executing the program. In addition, the CPU 11 of the vehicle-mounted device 10 according to the present embodiment implements the functions of the units shown in FIG. 13 by writing a control program stored in the storage unit 14 into RAM, and executing the program.

As shown in FIG. 13, the CPU 31 of the infrastructure camera 30A according to the present embodiment functions as an operation control unit 31A and a data transmitting unit 31C. Some of the components of the infrastructure camera 30A are the same as in the infrastructure camera 30 described for the second embodiment above, and repeated description of these is omitted.

In addition, the CPU 21 of the autonomous driving control device 20C according to the present embodiment functions as a data collection unit 21K, a recognition unit 21L, a feature quantity distribution creation unit 21B, an erroneous recognition judgement unit 21H, an operator presentation unit 21E, a recognition model learning unit 21F, and a vehicle notification unit 21J. Components in the autonomous driving control device 20C which are the same as in the autonomous driving control device 20A of the second embodiment above have the same reference numerals as in the second embodiment, and repeated description of these is omitted.

The data collection unit 21K collects image data and sensor data from the infrastructure camera 30, and accumulates the collected image data and sensor data in the data/model accumulation DB 25B, as in the example of FIG. 12 described above.

The recognition unit 21L performs recognition of obstacles by using a recognition model stored in the data/model accumulation DB 25B, based on the image data collected by the data collection unit 21K, or on the image data and sensor data, as in the example of FIG. 12 described above. The recognition unit 21L accumulates the obstacle recognition results in the data/model accumulation DB 25B, with the recognition results being accumulated in association with image data and sensor data. As described above, the obstacle recognition results can include, for example, the recognition ID of an obstacle, the time, position information, type, tracking duration, direction of the obstacle, speed of the obstacle, coordinates of the obstacle in the grid, etc.

In the present embodiment a recognition unit 21L is provided in the autonomous driving control device 20C, and obstacle recognition processing is performed by the autonomous driving control device 20C instead of by the infrastructure camera 30A. Furthermore, with this embodiment, recognition models are updated by the autonomous driving control device 20C, instead of by the infrastructure camera 30A.

As described above, according to the present embodiment, when the recognition of an obstacle by the autonomous driving control device of the center is judged to be erroneous, the judgement results are immediately fed back to an autonomous vehicle. It is thereby made possible to prevent the travel of autonomous vehicles from being hindered due to erroneous recognition of obstacles.

The following additional remarks regarding the above embodiments are presented here.

(Appendix 1)

An autonomous driving system that includes a memory and at least one processor, wherein the processor is configured to:

recognize obstacles based on image data obtained by imaging a predetermined region that includes a road on which an autonomous vehicle travels, the imaging being performed by an imaging device installed at a specific location in the external environment of the autonomous vehicle, create a feature distribution that expresses a distribution of features related to obstacles recognized in the past, and compare the created feature quantity distribution with a feature quantity of an obstacle that is recognized as an evaluation subject, and judge whether the obstacle recognized as the evaluation subject is erroneously recognized.

(Appendix 2)

A non-transitory recording medium that stores an autonomous driving program for causing a computer to function as:

a recognition unit configured to recognize obstacles based on image data obtained by imaging a predetermined region including a road on which an autonomous vehicle travels, the imaging being performed by an imaging device installed at a specific location in the external environment of the autonomous vehicle, a creation unit configured to create a feature quantity distribution expressing a distribution of feature quantities related to obstacles recognized in the past by the recognition unit, and a judgement unit configured to compare the created feature quantity distribution with a feature quantity of an obstacle recognized as an evaluation subject, and judge whether the obstacle recognized as an evaluation subject is erroneously recognized.

The above embodiments of an autonomous driving system have been described only as examples. An embodiment may be in the form of programs for causing a computer to perform the functions of the respective units in an autonomous driving system, or may be in the form of a computer-readable non-transitory recording medium that stores these programs.

In addition, the examples of configurations of an autonomous driving system described in the above embodiment may be changed, depending on the situation, without departing from the scope of the invention.

Furthermore, the processing flows of programs described in the above embodiments are provided only as examples, and non-essential process steps may be deleted, new steps added, or the processing order changed, without departing from the scope of the invention.

Furthermore, in the above embodiments, cases have been described in which the processing according to the embodiment is realized by a software configuration, with a computer executing a program, however the present invention is not limited to this. Embodiments may be implemented, for example, by using a hardware configuration or by a combination of hardware and software configurations.

Although the present disclosure has been described in accordance with embodiments, it is to be understood that the present disclosure is not limited to these embodiments or configurations. The scope of the present disclosure also encompasses various modifications, including modifications within an equivalent range. In addition, various combinations and forms or other combinations and forms including only one additional element, two or more additional elements, or a portion of one additional element are also included in the scope of the present disclosure or the range of ideas.

What is claimed is:

1. An autonomous driving system comprising:
a recognition unit configured to recognize obstacles based on image data obtained by imaging a predetermined region including a road on which an autonomous vehicle travels, the imaging being performed by an imaging device installed at a specific location in the external environment of the autonomous vehicle;
a creation unit configured to create a feature quantity distribution expressing a distribution of features quantities relating to obstacles that have been recognized by recognition unit in the past for each of the locations where the obstacles were recognized and for each of the types of the obstacles; and
a judgement unit configured to compare (i) a feature amount distribution corresponding to the location and type of an obstacle recognized as an evaluation target created by the creation unit with (ii) a feature quantity of the obstacle recognized as the evaluation subject, to thereby judge whether the obstacle recognized as the evaluation subject is erroneously recognized.

2. The autonomous driving system according to claim 1, wherein the creation unit is configured to create, as the feature quantity distribution, at least one of a dwell time distribution expressing a distribution of dwell times of obstacles, a travel speed distribution expressing a distribution of travel speeds of obstacles, and a travel distance distribution expressing a distribution of travel distances of obstacles, and the judgement unit is configured to compare at least one of the dwell time distribution, the travel speed distribution, and the travel distance distribution respectively created by the creation unit, with at least one of a dwell time, a travel speed, and a travel distance of the obstacle recognized as the evaluation subject, to thereby judge whether the obstacle recognized as the evaluation subject is erroneously recognized.

3. The autonomous driving system according to claim 2, wherein the judgement unit is configured to perform the comparison based on at least one of a representative value obtained from a statistical analysis of the dwell time distribution, a representative value obtained from a statistical analysis of the travel speed distribution, and a representative value obtained from a statistical analysis of the travel distance distribution.

4. The autonomous driving system according to claim 2, wherein the judgement unit is configured to perform the comparison based on at least one of a threshold value obtained from the dwell time distribution, a threshold value obtained from the travel speed distribution, and a threshold value obtained from the travel distance distribution.

5. The autonomous driving system according to claim 4, further comprising a notification unit configured to, in response to the judgement unit judging that an obstacle is erroneously recognized, transmit obstacle information to an autonomous vehicle traveling in the surroundings of the obstacle, the obstacle information having a flag attached for removing the recognition results for the obstacle.

6. The autonomous driving system according to claim 5, further comprising a presentation unit configured to, in response to the judgement unit judging that an obstacle is erroneously recognized, present image data to an operator that corresponds to the time at which the judgement of erroneous recognition occurred, and receive, as input from the operator, an indication as to whether there is an anomaly, and wherein the notification unit is configured to, in response to an input notifying an anomaly being received from the operator, send the obstacle information to an autonomous vehicle traveling in the surroundings of the obstacle, the obstacle information having a flag attached for removing the recognition results for the obstacle.

7. The autonomous driving system according to claim 1, further comprising a learning unit configured to, in response to an obstacle being judged by the judgement unit to be erroneously recognized, perform learning of an obstacle recognition model, the learning being performed by using judgement results input by the operator as a label, and the judgement results including an indication of whether there is an anomaly and the causes thereof.

8. An autonomous driving method comprising:
recognizing obstacles based on image data obtained by imaging a predetermined region including a road on which an autonomous vehicle travels, the imaging being performed by an imaging device installed at a specific location in the external environment of the autonomous vehicle;

creating a feature quantity distribution expressing a distribution of feature quantities relating to obstacles that have been recognized in the past for each of the locations where the obstacles were recognized and for each of the types of the obstacles; and comparing (i) the created feature amount distribution corresponding to the location and type of an obstacle recognized as an evaluation target with (ii) a feature quantity of the obstacle recognized as the evaluation subject, to thereby judge whether the obstacle recognized as the evaluation subject is erroneously recognized.

9. A non-transitory computer-readable storage medium for storing an autonomous driving program for causing a computer to execute a process, the process comprising:

recognizing obstacles based on image data obtained by imaging a predetermined region including a road on which an autonomous vehicle travels, the imaging being performed by an imaging device installed at a specific location in the external environment of the autonomous vehicle;

creating a feature quantity distribution expressing a distribution of features quantities relating to obstacles that have been recognized in the past for each of the locations where the obstacles were recognized and for each of the types of the obstacles; and comparing (i) a feature amount distribution corresponding to the location and type of an obstacle recognized as an evaluation target created with (ii) a feature quantity of the obstacle recognized as the evaluation subject, to thereby judge whether the obstacle recognized as the evaluation subject is erroneously recognized.

* * * * *